(12) United States Patent
Pistoia et al.

(10) Patent No.: US 8,918,886 B2
(45) Date of Patent: *Dec. 23, 2014

(54) TRAINING CLASSIFIERS FOR PROGRAM ANALYSIS

(71) Applicant: International Business Machines Corporation, Armonk, NY (US)

(72) Inventors: Marco Pistoia, Amawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,464

(22) Filed: Oct. 25, 2012

(65) Prior Publication Data
US 2014/0090069 A1 Mar. 27, 2014

Related U.S. Application Data

(63) Continuation of application No. 13/626,402, filed on Sep. 25, 2012.

(51) Int. Cl.
*H04L 29/06* (2006.01)

(52) U.S. Cl.
USPC ............................................. 726/25; 713/188

(58) Field of Classification Search
USPC ....................................................... 726/25
See application file for complete search history.

(56) References Cited

U.S. PATENT DOCUMENTS

| | | | |
|---|---|---|---|
| 8,161,548 B1 * | 4/2012 | Wan | 726/22 |
| 2005/0283834 A1 * | 12/2005 | Hall et al. | 726/24 |
| 2007/0016894 A1 | 1/2007 | Sreedhar | |
| 2008/0229423 A1 | 9/2008 | Hall et al. | |
| 2009/0172818 A1 | 7/2009 | Sutherland et al. | |
| 2010/0333069 A1 | 12/2010 | Chandra et al. | |
| 2011/0030057 A1 | 2/2011 | Chen et al. | |
| 2011/0321016 A1 | 12/2011 | Haviv et al. | |

OTHER PUBLICATIONS

Muhammad Atif Tahir, Ahmed Bouridane, Fatih Kurugollu, Simultaneous feature selection and feature weighting using Hybrid Tabu Search/K-nearest neighbor classifier, Pattern Recognition Letters, vol. 28, Issue 4, Mar. 1, 2007, pp. 438-446, ISSN 0167-8655.*

Anonymous, "System, method and apparatus for reducing false positives in the anomaly detection system by using static analysis of the application", IP.com Prior Art Database. Nov. 2011. (2 Pages) http://priorartdatabase.com/IPCOM/000212141.

(Continued)

*Primary Examiner* — Yogesh Paliwal

(74) *Attorney, Agent, or Firm* — Tutunjian & Bitetto, P.C.; Anne V. Dougherty

(57) ABSTRACT

Classifier training modules and systems are shown that include a memory configured to store a known vulnerability distribution and an initial feature set; and a processor configured to run an initial security analysis on a training codebase to generate a set of vulnerabilities associated with the training codebase, to analyze the program with the feature set to limit a number of detected vulnerabilities to generate a limited set of vulnerabilities associated with the feature set, to compare the limited set of vulnerabilities to the known vulnerability distribution to generate an accuracy score, and to iteratively refine the analysis by updating the feature set to find a feature set having a highest accuracy score.

23 Claims, 3 Drawing Sheets

(56) References Cited

OTHER PUBLICATIONS

Anonymous, "Using multiple predictions and standard statistical measures to reduce false positives during real-time, time series analysis of metrics which measure operating system behavior"IP.com Prior Art Database. Apr. 2010. (3 Pages) http://priorartdatabase.com/IPCOM/000195181.

Lawall, J.L., et al.; "WYSIWIB: A declarative approach to finding API protocols and bugs in Linux code", Proceedings of the 2009 IEEE/IFIP International Conference on Dependable Systems and Networks, DSN 2009. Jun. 2009. pp. 43-52.

Wang, Y., et al.; "An application of interval analysis in software static analysis"; 2008 IEEE/IPIP International Conference on Embedded and Ubiquitous Computing (EUC 2008). Dec. 2008. pp. 367-372.

Zhao, Y., et al.; "STVL: Improve the Precision of Static Defect Detection with Symbolic Three-Valued Logic"; 2011 18th Asia Pacific Software Engineering Conference. Dec. 2011. pp. 179-186.

Skorin-Kapov, N., et al. "A New Approach to Optical Networks Security: Attack-Aware Routing and Wavelength Assignment" IEEE/ACM Transactions on Networking, vol. 18, No. 3. Jun. 2010. (12 Pages).

International Search Report issued for International Application No. PCT/US13/61615 on Apr. 10, 2014. (2 Pages).

\* cited by examiner

TRAINING CLASSIFIERS FOR PROGRAM ANALYSIS

RELATED APPLICATION INFORMATION

This application is a Continuation application of copending U.S. patent application Ser. No. 13/626,402 filed on Sep. 25, 2012, incorporated herein by reference in its entirety.

BACKGROUND

1. Technical Field

The present invention relates to static program analysis and, more particularly, to training classifiers for static program analysis.

2. Description of the Related Art

A significant limitation of static analysis tools is their inherent imprecision. This is due to the fact that the analysis operates on an abstract representation of the concrete program to avoid from state-space explosion. If a concrete representation of a program were used, analysis would need to consider every possible state of the program, which results in a potentially infinite state space. Using abstract representations makes the analysis tractable, but creates the risk of finding false positives when searching for potential vulnerabilities.

In one example, a class of JavaScript vulnerabilities was discovered that were due to a weakness in infrastructure code released by a major browser provider. Web developers were instructed to copy the vulnerable code into their web applications. Although the code is vulnerable in principles, the runtime configuration in which it can actually be exploited is so rare that, for all practical purposes, it was deemed safe.

However, this source of false positives is highly prevalent in the wild, as many web applications indeed incorporate the relevant infrastructure code. As a result, static analysis programs report a prohibitive number of false positives on virtually every JavaScript application.

SUMMARY

A method for training a classifier is shown that includes running an initial security analysis on a training codebase to generate a set of vulnerabilities associated with the training codebase; analyzing the program with a feature set that limits a number of detected vulnerabilities to generate a limited set of vulnerabilities associated with the feature set; comparing the limited set of vulnerabilities to a known vulnerability distribution to generate an accuracy score using a processor; and iterating said steps of analyzing and comparing using different feature sets to find a feature set having a highest accuracy score.

A further method for training a classifier is shown that includes running an initial security analysis on a training codebase to generate a set of vulnerabilities associated with the training codebase; analyzing the program with a feature set, comprising vulnerability path length, that limits a number of detected vulnerabilities to generate a limited set of vulnerabilities associated with the feature set; comparing a number of vulnerabilities per line of code found with the limited set of vulnerabilities to a known statistical representation of vulnerability prevalence to generate an accuracy score using a processor; iterating said steps of analyzing and comparing using different feature sets to find a feature set having a highest accuracy score; and generating a classifier based on the feature set having a highest accuracy score.

A method for security analysis is shown that includes training a classifier and scanning code using the classifier to locate potential vulnerabilities. Training a classifier includes running an initial security analysis on a training codebase to generate a set of vulnerabilities associated with the training codebase; analyzing the program with a feature set that limits a number of detected vulnerabilities to generate a limited set of vulnerabilities associated with the feature set; comparing the limited set of vulnerabilities to a known vulnerability distribution to generate an accuracy score using a processor; iterating said steps of analyzing and comparing using different feature sets to find a feature set having a highest accuracy score; and generating a classifier based on the feature set having the highest accuracy score.

A further method for security analysis is shown that includes training a classifier and scanning code using the classifier to locate potential vulnerabilities. Training a classifier includes running an initial security analysis on a training codebase comprising a first set of applications and a user's local codebase to generate a set of vulnerabilities associated with the training codebase; analyzing the program with a feature set, comprising vulnerability path length, that limits a number of detected vulnerabilities to generate a limited set of vulnerabilities associated with the feature set; comparing a number of vulnerabilities per line of code found with the limited set of vulnerabilities to a known statistical representation of vulnerability prevalence based on a manual analysis of a second set of applications to generate an accuracy score using a processor; iterating said steps of analyzing and comparing using different feature sets to find a feature set having a highest accuracy score; and generating a classifier based on the feature set having the highest accuracy score.

A classifier training module is shown that includes a memory configured to store a known vulnerability distribution and an initial feature set; and a processor configured to run an initial security analysis on a training codebase to generate a set of vulnerabilities associated with the training codebase, to analyze the program with the feature set to limit a number of detected vulnerabilities to generate a limited set of vulnerabilities associated with the feature set, to compare the limited set of vulnerabilities to the known vulnerability distribution to generate an accuracy score, and to iteratively refine the analysis by updating the feature set to find a feature set having a highest accuracy score.

A further classifier training module is shown that includes a memory configured to store a known statistical representation of vulnerability prevalence and an initial feature set comprising vulnerability path length; and a processor configured to run an initial security analysis on a training codebase to generate a set of vulnerabilities associated with the training codebase, to analyze the training codebase with a feature set that limits a number of detected vulnerabilities to generate a limited set of vulnerabilities associated with the feature set, to compare a number of vulnerabilities per line of code found with the limited set of vulnerabilities to the known statistical representation of vulnerability prevalence to generate an accuracy score using a processor, to iteratively refine the analysis by updating the feature set to find a feature set having a highest accuracy score, and to generate a classifier based on the feature set having a highest accuracy score.

A static security analysis system is shown that includes a classifier training module and a static analysis module configured to scan code using the classifier to locate potential vulnerabilities. The classifier training module includes a memory configured to store a known vulnerability distribution and an initial feature set; and a processor configured to run an initial security analysis on a training codebase to generate a set of vulnerabilities associated with the training codebase, to analyze the program with the feature set to limit a number of detected vulnerabilities to generate a limited set of vulnerabilities associated with the feature set, to compare the limited set of vulnerabilities to the known vulnerability distribution to generate an accuracy score, to iteratively refine the analysis by updating the feature set to find a feature set having a highest accuracy score, and to generate a classifier based on the feature set having the highest accuracy score.

A further static security analysis system is shown that includes a classifier training module and a static analysis module configured to scan code using the classifier to locate potential vulnerabilities. The classifier training module includes a memory configured to store a known statistical representation of vulnerability prevalence and an initial feature set comprising vulnerability path length; and a processor configured to run an initial security analysis on a training codebase to generate a set of vulnerabilities associated with the training codebase, to analyze the training codebase with a feature set that limits a number of detected vulnerabilities to generate a limited set of vulnerabilities associated with the feature set, to compare a number of vulnerabilities per line of code found with the limited set of vulnerabilities to the known statistical representation of vulnerability prevalence to generate an accuracy score using a processor, to iteratively refine the analysis by updating the feature set to find a feature set having a highest accuracy score, and to generate a classifier based on the feature set having a highest accuracy score.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide a strategy for suppressing false positives in static analysis that follows a Bayesian line of reasoning. Toward that end, the present principles automatically converge on a set of features that separate between "true" and "false" findings of vulnerabilities by trying out different candidate feature sets and converging on the feature set that produces a distribution of "true" vulnerabilities that is closest to a known vulnerability distribution in the real world.

For example, consider a web application where two types of vulnerability are discovered: cross-site scripting (XSS) and structured query language injection (SQLi). Each of these issues can be characterized with a set of features. For example, the set of features may include a number of flow steps (F1) and code locations visited by the flow (F2).

In this example, it is assumed that real world statistics show 0.1 XSS vulnerabilities and 0.2 SQLi vulnerabilities per code location. The following list shows exemplary values for F1 and F2 and exemplary outcomes of the search:

If only F1 is used and set to threshold value 14, then static analysis finds 0.12 XSS vulnerabilities per code location and 0.23 SQLi vulnerabilities per code location;

If only F1 is used and set to threshold value 11, then static analysis finds 0.05 XSS vulnerabilities per code location and 0.1 SQLi vulnerabilities per code location;

If both F1 and F2 are used, where F1 is set to value 11 and F2 forbids code location X, then static analysis converges on 0.105 XSS vulnerabilities per code location and 0.2005 SQLi vulnerabilities per code location;

etc.

Pursuant to this example, the last set of features F1 and F2 produces the closest number of vulnerabilities to the known statistical distribution of such vulnerabilities in the wild. In essence, selecting values for these features "tunes" the analysis to ignore supposed vulnerabilities that deviate substantially from what is known to exist in the wild. Using a search process similar to the one set forth above based on, e.g., a hill-climbing or Tabu search strategy, the present principles allow a system to converge on a set of features and feature values that determine an optimal classification algorithm. This convergence is performed based on the applications used to train the static analysis and the statistical security knowledge the system was fed regarding real world distributions of vulnerabilities. Thus there are three inputs to such a system: a set of candidate features for search, a set of applications to train on (benchmarks), and the knowledge of the distribution of vulnerabilities in the wild. These inputs guide the search for an optimal configuration of features.

Figure 1:
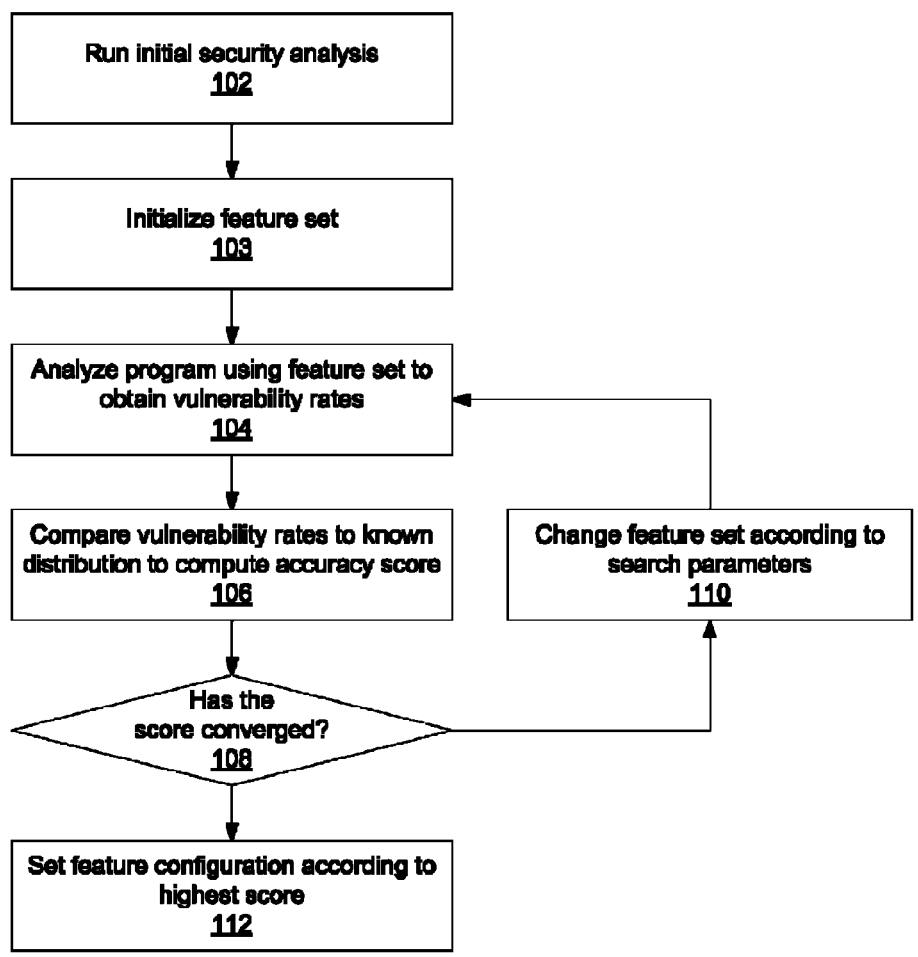
FIG. 1 is a block/flow diagram of a method for finding an optimal feature set for a static security analysis classifier according to the present principles.

Referring now to the drawings in which like numerals represent the same or similar elements and initially to FIG. 1, a method for Bayesian classifier training is shown for static analysis. Block 102 performs an initial security analysis of a program. This analysis determines what types of potential security vulnerabilities are present within the program, such that a distribution of those vulnerabilities in the wild may be acquired for use in optimizing feature parameters. Block 103 initializes the feature set. This may include setting relevant features to zero (e.g., path length) and turning off all features but one. The motivation for looking at the number of flow steps in a path is that almost any transition taken by a given static analysis is potentially infeasible in a concrete run, due to the abstraction the analysis employs when scanning the program. Therefore, as the number of flow steps in a finding grows, any given finding is more likely to be a false positive. Similarly, a "real" vulnerability often has a locality feature, such that the vulnerability doesn't cross through the boundaries of many code modules. Moreover, some modules are unlikely to participate in any security flow. Thus, a report including milestones within such modules is likely to be wrong—features that limit code positions can therefore put additional limitations on the number of false positives.

Block 104 analyzes the program again using the feature set to obtain updated vulnerability rates. A rate for each of the vulnerabilities discovered in block 102 is found and stored. Block 106 compares the vulnerability rates found in block 104 to a set of known vulnerability rates for programs in the wild. This "true" set of rates may be generated by statistical analysis of a set of example programs that have been manually audited to determine an actual number of vulnerabilities. In making this comparison, block 106 generates an accuracy score that represents how close the feature sets used in block 104 come to providing vulnerability rates that match the true set.

Block 108 determines whether the score has converged. This may be determined by running the search a fixed number of times without substantial change in the accuracy score, as measured by the differences between scores falling within some minimum threshold. If the score has not converged, block 110 changes the feature set according to search parameters. This may include changing a value for a feature and/or adding or removing a feature from the analysis entirely. Block 110 then returns processing to block 104 for analysis using the new set of features. It should be noted that other halting mechanisms may be used in the place of convergence. For example, the loop may halt upon finding an accuracy score that is greater than a given threshold, after reaching a predetermined maximum number of iterations, or upon some combination of factors. Once the loop halts at block 108, block 112 sets the feature configuration according to the feature set that produced the highest score. This feature configuration is subsequently used in live static security analysis to limit the number of false positives.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present principles leverage two important facts that hold in the domain of security analysis. First, detailed statistics about the prevalence and nature of security vulnerabilities are readily available. In parallel to automated security analysis, security projects, organizations, and experts perform manual assessment of web applications on a regular basis. Reports by IBM's X-Force, as well as by OWASP and various other security research organizations, provide detailed statistics on the prevalence and distribution of security vulnerabilities across different types of applications. Second, security findings can be encoded along multiple dimensions, including the number of flow steps an issue includes, the core modules involved in the flow steps, the number and kind of control-flow tests performed along the vulnerable flow, the "taint carriers" used to propagate the vulnerable data, etc. This follows from the fact that security findings are highly structured with well-known attributes and clear semantics. These attributes include the issue type, its severity, its exploitability, the flow steps it includes, etc. The flow steps are, in and of themselves, also structured data items.

Figure 2:
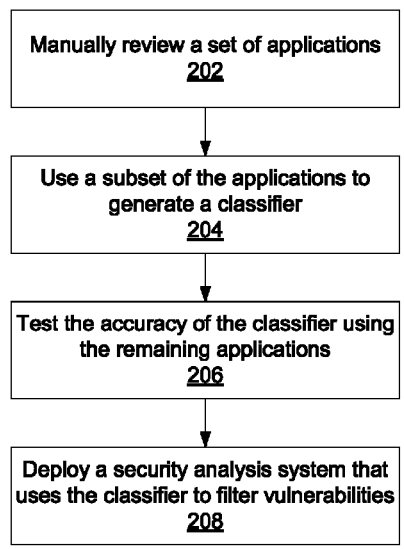
FIG. 2 is a block/flow diagram of a method for performing in-house training of a static security analysis classifier according to the present principles.

Referring now to FIG. 2, a method for in-house training of security analysis systems is shown. In block 202, a set of applications are manually reviewed by security experts to determine an actual number of vulnerabilities in each. These manually generated statistics may be used to represent the known statistics of vulnerability prevalence. Block 204 uses a subset of those vulnerabilities as described above in FIG. 1 to train a classifier that closely matches the actual vulnerability distribution. Block 204 may employ the user's own codebase toward this end, such that the classifier may be trained to accommodate a specific framework or coding idiom. This allows block 204 to specialize a classifier according to the particular features found in the customer's applications. Block 206 then tests the accuracy on the remaining applications to determine whether the trained classifier is accurate outside the bounds of the training subset. It should be noted that blocks 204 and 206 may be repeated using different subsets of the applications to find an optimal classifier. Block 208 deploys the trained classifier in a security analysis system. The classifier is used as a post-processing step to filter and/or prioritize discovered vulnerabilities.

Figure 3:
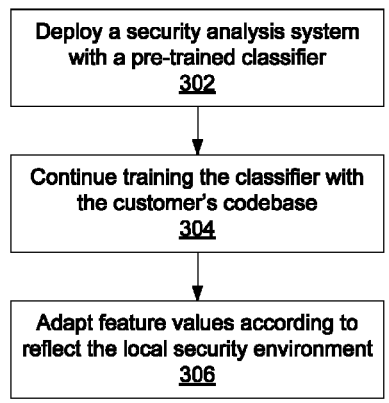
FIG. 3 is a block/flow diagram for performing online training of a static security analysis classifier according to the present principles.

Referring now to FIG. 3, a method for online training is shown, providing the ability to specialize the classifier by continuing the learning process in the customer's environment. For example, a customer's codebase may incorporate quirks and processes that affect how given vulnerabilities are detected. Block 302 deploys a security system having a pretrained classifier. Block 304 continues to train the classifier using the customer's own codebase, allowing it to be exposed to the peculiarities of the codebase and use those peculiarities as a basis for further refinement. Block 306 uses the training to adjust the feature sets described above to adapt the classifier to optimize it for the local security environment.

Figure 4:
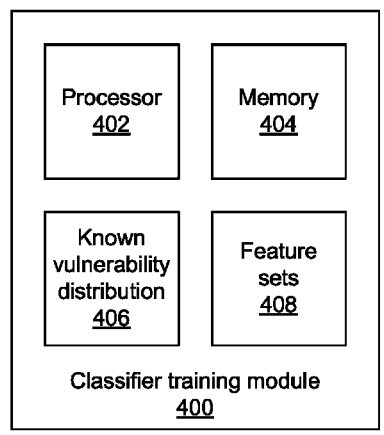
FIG. 4 is a diagram of a security analysis classifier training module according to the present principles.

Referring now to FIG. 4, a classifier training module 400 is shown. The module 400 includes a processor 402 and a memory 404. The processor performs static analyses on program code stored in, e.g., memory 404 or provided externally, using a progressively updated feature set 408 stored in memory 404. The outcome of the static analysis includes a determination of vulnerabilities present in the program as well as a calculation for how frequently such vulnerabilities occur. The processor 402 compares the vulnerability frequency output of the static analysis to a known vulnerability distribution that represents the vulnerability distribution in the wild, producing an accuracy score. Based on this accuracy score, processor 402 updates the feature sets 408 stored in memory 404.

Figure 5:
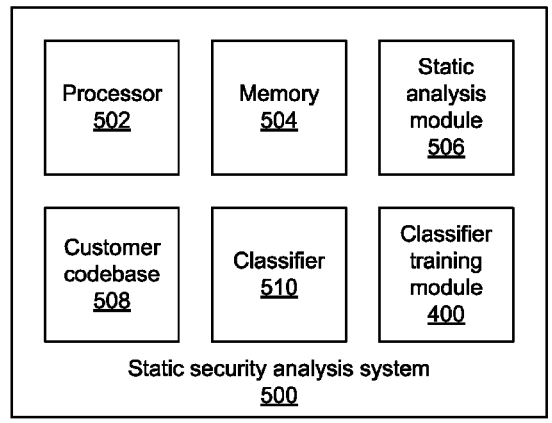
FIG. 5 is a diagram of a static security analysis system according to the present principles.

Referring now to FIG. 5, a static security analysis system 500 is shown that includes a processor 502 and memory 504. A static analysis module 506 performs security analyses on a codebase 508, generating a set of discovered vulnerabilities. A classifier 510 is used to prioritize and/or filter the vulnerabilities according to a feature set, where vulnerabilities that fall outside the classifier's feature set (e.g., by having a path length longer than a feature path length) are filtered out entirely or given lower priority. Additionally, a classifier training module 400 may be employed to provide online updates to classifier 510, such that particular features relating to the customer's codebase 308 may be discovered and adapted to. It should be noted that the role of processor 402 and memory 404 may be filled by processor 502 and memory 504 in the context of a larger static security analysis system.

Having described preferred embodiments of a system and method for training classifiers for program analysis (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A classifier training module, comprising:
a memory configured to store a known vulnerability distribution and an initial feature set; and
a processor configured to run an initial security analysis on a training codebase to generate a set of vulnerabilities associated with the training codebase, to analyze a program with the initial feature set to limit a number of detected vulnerabilities to generate a limited set of vulnerabilities associated with the initial feature set, to compare the limited set of vulnerabilities to the known vulnerability distribution to generate an accuracy score, and to iteratively refine the analysis by updating the feature set to find a feature set having a highest accuracy score.

2. The classifier training module of claim 1, wherein the feature set includes vulnerability path length.

3. The classifier training module of claim 1, wherein the feature set includes one or more blocked code locations.

4. The classifier training module of claim 1, wherein the known vulnerability distribution comprises a statistical representation of vulnerability prevalence.

5. The classifier training module of claim 1, wherein the processor is further configured to compare numbers of vulnerabilities per line of code.

6. The classifier training module of claim 1, wherein the processor is further configured to generate a classifier based on the feature set having a highest accuracy score.

7. The classifier training module of claim 1, wherein the training codebase comprises a first set of applications and wherein the known vulnerability distribution is based on a manual analysis of a second set of applications.

8. The classifier training module of claim 7, wherein the training codebase further comprises a user's local codebase.

9. The classifier training module of claim 1, wherein each iteration uses a different feature set based on a Tabu search strategy.

10. A classifier training module, comprising:
a memory configured to store a known statistical representation of vulnerability prevalence and an initial feature set comprising vulnerability path length; and
a processor configured to run an initial security analysis on a training codebase to generate a set of vulnerabilities associated with the training codebase, to analyze the training codebase with a feature set that limits a number of detected vulnerabilities to generate a limited set of vulnerabilities associated with the feature set, to compare a number of vulnerabilities per line of code found with the limited set of vulnerabilities to the known statistical representation of vulnerability prevalence to generate an accuracy score using a processor, to iteratively refine the analysis by updating the feature set to find a feature set having a highest accuracy score, and to generate a classifier based on the feature set having a highest accuracy score.

11. The classifier training module of claim 10, wherein the feature set includes one or more blocked code locations.

12. The classifier training module of claim 10, wherein the training codebase comprises a first set of applications and wherein the known vulnerability distribution is based on a manual analysis of a second set of applications.

13. The classifier training module of claim 10, wherein the training codebase further comprises a user's local codebase.

14. A static security analysis system, comprising:
a classifier training module, comprising:
a memory configured to store a known vulnerability distribution and an initial feature set; and
a processor configured to run an initial security analysis on a training codebase to generate a set of vulnerabilities associated with the training codebase, to analyze a program with the initial feature set to limit a number of detected vulnerabilities to generate a limited set of vulnerabilities associated with the initial feature set, to compare the limited set of vulnerabilities to the known vulnerability distribution to generate an accuracy score, to iteratively refine the analysis by updating the feature set to find a feature set having a highest accuracy score, and to generate a classifier based on the feature set having the highest accuracy score; and
a static analysis module configured to scan code using the classifier to locate potential vulnerabilities.

15. The static security analysis system of claim 14, wherein the feature set includes vulnerability path length.

16. The static security analysis system of claim 14, wherein the feature set includes one or more blocked code locations.

17. The static security analysis system of claim 14, wherein the known vulnerability distribution comprises a statistical representation of vulnerability prevalence.

18. The static security analysis system of claim 14, wherein the processor is further configured to compare numbers of vulnerabilities per line of code.

19. The static security analysis system of claim 14, wherein the training codebase comprises a first set of applications and wherein the known vulnerability distribution is based on a manual analysis of a second set of applications.

20. The static security analysis system of claim 19, wherein the training codebase further comprises a user's local codebase.

21. The static security analysis system of claim 14, wherein each iteration uses a different feature set based on a Tabu search strategy.

22. A static security analysis system, comprising:
a classifier training module, comprising:
a memory configured to store a known statistical representation of vulnerability prevalence and an initial feature set comprising vulnerability path length; and
a processor configured to run an initial security analysis on a training codebase to generate a set of vulnerabilities associated with the training codebase, to analyze the training codebase with a feature set that limits a number of detected vulnerabilities to generate a limited set of vulnerabilities associated with the feature set, to compare a number of vulnerabilities per line of code found with the limited set of vulnerabilities to the known statistical representation of vulnerability prevalence to generate an accuracy score using a processor, to iteratively refine the analysis by updating the feature set to find a feature set having a highest accuracy score, and to generate a classifier based on the feature set having a highest accuracy score; and
a static analysis module configured to scan code using the classifier to locate potential vulnerabilities.

23. A non-transitory computer readable storage medium comprising a computer readable program for training a classifier, wherein the computer readable program when executed on a computer causes the computer to perform the steps of:
running an initial security analysis on a training codebase to generate a set of vulnerabilities associated with the training codebase;
analyzing a program with a feature set that limits a number of detected vulnerabilities to generate a limited set of vulnerabilities associated with the feature set;
comparing the limited set of vulnerabilities to a known vulnerability distribution to generate an accuracy score using a processor; and
iterating said steps of analyzing and comparing using different feature sets to find a feature set having a highest accuracy score.

* * * * *